US012711138B2

(12) United States Patent
Sheward et al.

(10) Patent No.: US 12,711,138 B2
(45) Date of Patent: Aug. 18, 2026

(54) METHOD AND APPARATUS FOR AN AI-ASSISTED VIRTUAL ASSISTANT

(71) Applicant: PwC Product Sales LLC, New York, NY (US)

(72) Inventors: Paul Sheward, Chicago, IL (US); Chung-Sheng Li, Scarsdale, NY (US); Scott Likens, Austin, TX (US); Saverio Fato, Wilton Manors, FL (US); Joseph Doyle Harrington, Granite Bay, CA (US); Joseph David Voyles, Louisville, KY (US); Jonathan B. Rhine, Suffern, NY (US); Alexander Nicholas Boldizsar, Woodstock, CT (US); Winnie Cheng, West New York, NJ (US); Todd Christopher Morrill, Newburgh, NY (US); Yuan Wan, Irvine, CA (US); William Spotswood Seward, Los Angeles, CA (US)

(73) Assignee: PwC Product Sales LLC, New York, NY (US)

( * ) Notice: Subject to any disclaimer, the term of this patent is extended or adjusted under 35 U.S.C. 154(b) by 0 days.

(21) Appl. No.: 18/327,854

(22) Filed: Jun. 1, 2023

(65) Prior Publication Data

US 2024/0403302 A1 Dec. 5, 2024

(51) Int. Cl.
*G06F 16/2457* (2019.01)
*G06F 16/2453* (2019.01)
*G06F 16/2455* (2019.01)

(52) U.S. Cl.
CPC .. *G06F 16/24575* (2019.01); *G06F 16/24542* (2019.01); *G06F 16/2455* (2019.01)

(58) Field of Classification Search
None
See application file for complete search history.

(56) References Cited

U.S. PATENT DOCUMENTS

| | | | | |
|---|---|---|---|---|
| 10,706,450 | B1 | 7/2020 | Tavernier | |
| 2012/0167010 | A1 | 6/2012 | Campbell | |
| 2021/0004711 | A1* | 1/2021 | Gupta | G06N 5/02 |
| 2021/0073661 | A1* | 3/2021 | Matlick | H04L 61/3025 |
| 2021/0082414 | A1* | 3/2021 | Johnson | G06F 16/90332 |
| 2021/0149963 | A1* | 5/2021 | Agarwal | G06F 16/90332 |
| 2021/0326742 | A1* | 10/2021 | Rosset | G06N 20/00 |
| 2021/0334698 | A1* | 10/2021 | Vo | G06N 20/00 |
| 2022/0086108 | A1* | 3/2022 | Higgins | G06F 18/24 |
| 2023/0315722 | A1* | 10/2023 | Saxe | G06N 20/00 726/1 |
| 2023/0316138 | A1* | 10/2023 | Nguyen | G06N 20/00 706/11 |

OTHER PUBLICATIONS

International Search Report and Written Opinion mailed Aug. 25, 2023, directed to International Application No. PCT/US2023/024121; 10 pages.

* cited by examiner

*Primary Examiner* — Courtney Harmon
(74) *Attorney, Agent, or Firm* — Morrison & Foerster LLP

(57) ABSTRACT

Provided is a method for generating a personalized content suggestion in response to a query from a user. The method may be performed by a system comprising one or more processors. The method may include receiving the query from the user, generating one or more user parameters associated with the user, determining a predicted content topic of the query, and generating the content suggestion based on the predicted content topic and the one or more user parameters.

17 Claims, 11 Drawing Sheets

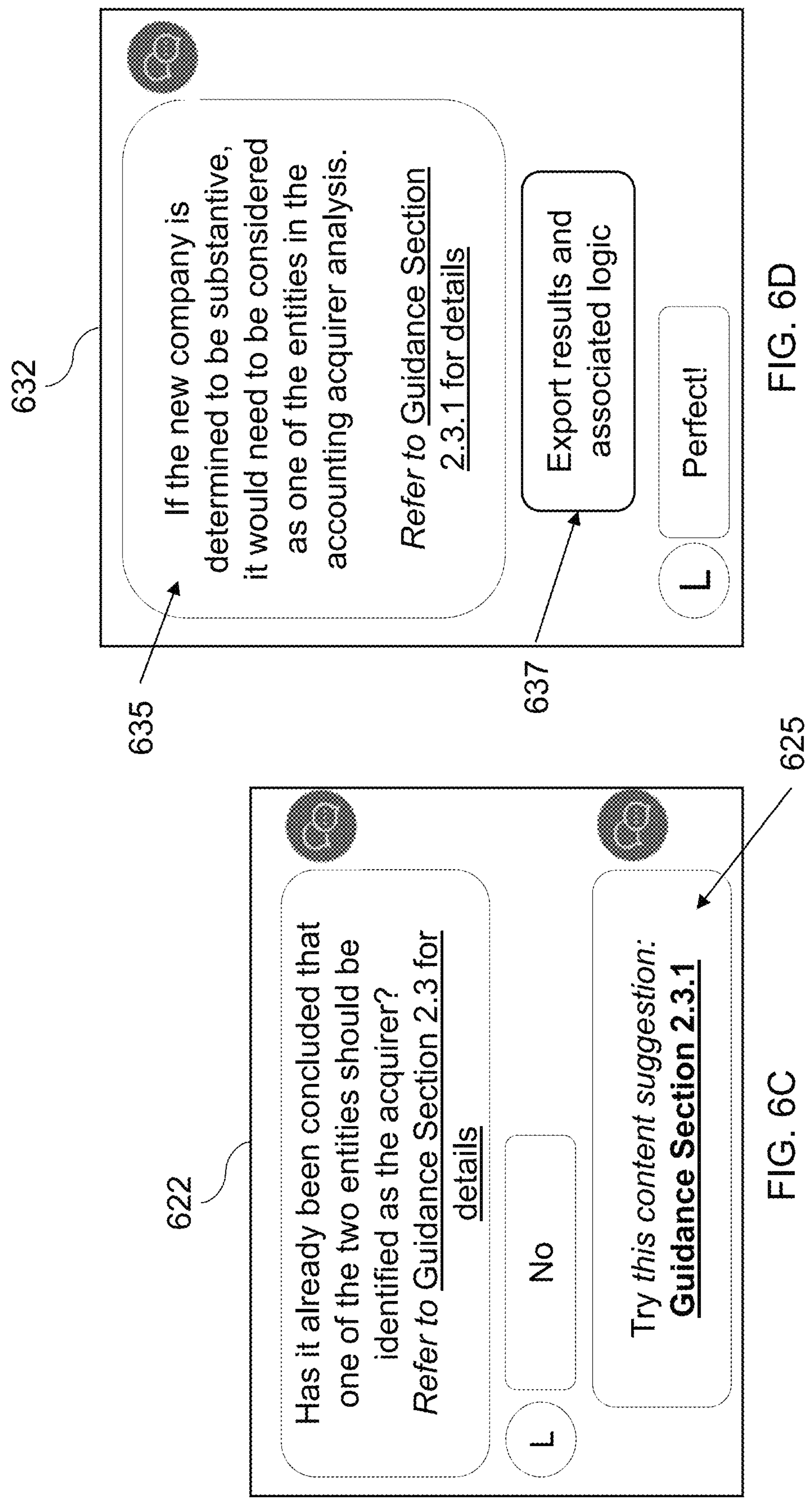
632
If the new company is determined to be substantive, it would need to be considered as one of the entities in the accounting acquirer analysis.
Refer to Guidance Section 2.3.1 for details
Export results and associated logic
L
Perfect!
635
637
FIG. 6D
622
Has it already been concluded that one of the two entities should be identified as the acquirer?
Refer to Guidance Section 2.3.1 for details
L
No
Try this content suggestion:
Guidance Section 2.3.1
625
FIG. 6C

METHOD AND APPARATUS FOR AN AI-ASSISTED VIRTUAL ASSISTANT

FIELD

The present invention relates to systems and methods for providing a virtual assistant, and more specifically, to systems and methods for providing personalized content suggestions using an AI-assisted virtual assistant.

BACKGROUND

When searching for information from a content repository, users can rely on a variety of tools. One common tool users rely on for web searching is a search engine. Search engines receive a search query from a user and then search a content repository, such as the world wide web, for information related to the user's search query. However, search engines often fail to locate information that is truly relevant and helpful to the user, as they tend to search for instances of exact matches to the search query. This is especially true when a user supplies a specialized query, such as an accounting or audit question, which requires knowledge of the subject matter of the query to return relevant content.

SUMMARY

As explained above, while search engines can be useful to retrieve basic information in response to simple queries, search engines can fail to locate relevant and helpful information when searching in response to a specialized query. Another tool a user can rely on when seeking specialized information from a content repository is a chatbot. Chatbots can utilize word-classification processes, natural-language processing, and artificial intelligence, enabling the chatbot to generate responses using common phrases or pre-defined responses. When relying on a chatbot for content searching, a user can supply a query, and the chatbot can engage in a conversation with the user to narrow that query and provide a response that it determines to be most relevant to the user's query. While chatbots may provide more relevant information to a user by relying on artificial intelligence, chatbots nonetheless fail to incorporate specialized knowledge necessary to return relevant responses for complex queries, and they fail to appreciate certain information about the user that can improve the relevance of the responses provided to the user. Accordingly, there exists a need for an improved content searching tool that can utilize information about the user and specialized knowledge related to the query to return highly relevant and personalized content in response to a user's query.

Described herein are systems and methods for generating a personalized content suggestion in response to a query from a user. The user can provide a query to a chatbot-style virtual assistant, and the virtual assistant can then refine the query to identify content from a content repository to suggest to the user. The virtual assistant can refine the query based on user parameters associated with the user. The virtual assistant can passively generate user parameters based on metadata associated with the user and/or actively based on the user's responses to one or more questions provided by the virtual assistant. Refining the query based on the one or more user parameters allows the virtual assistant to identify content that is more likely relevant to the user and to personalize the content suggestion that the virtual assistant generates. The virtual assistant may refine the query based on user responses to one or more scoping and/or clarifying questions provided by the virtual assistant. The scoping and/or clarifying questions can be based on specialized knowledge from one or more knowledge bases, enabling the virtual assistant to apply that specialized knowledge to analyze complex queries. Accordingly, the virtual assistant can provide improved content suggestions to the user that are personalized based on the one or more user parameters and that are informed based on specialized information.

A method for generating a personalized content suggestion in response to a query from a user may be performed by a system comprising one or more processors and may comprise receiving the query from the user, generating one or more user parameters associated with the user, determining a predicted content topic of the query, and generating the content suggestion based on the predicted content topic and the one or more user parameters.

In some embodiments, the method comprises revising the query.

In some embodiments, revising the query comprises providing a scoping prompt to the user, receiving a scoping response from the user in response to providing the scoping prompt to the user, and revising the query based on the scoping response.

In some embodiments, revising the query comprises providing one or more topic suggestions to the user, receiving a selected content topic of one or more potential content topics in response to providing the one or more topic suggestions to the user, and revising the query based on the selected content topic.

In some embodiments, the one or more topic suggestions are generated based on information from a knowledge substrate.

In some embodiments, generating the one or more user parameters comprises providing one or more user context prompts to the user, receiving one or more user context responses from the user in response to providing the one or more user context prompts to the user, and generating the one or more user parameters based on the one or more user context responses.

In some embodiments, generating the one or more user parameters comprises analyzing metadata associated with the user.

In some embodiments, the metadata associated with the user comprises one or more of the user's search history, metadata associated with one or more team members on a team with the user, past projects completed by the user, and a job title of the user.

In some embodiments, determining the predicted content topic comprises providing a clarifying prompt to the user, receiving a clarifying response from the user in response to providing the clarifying prompt to the user, and determining the predicted content topic based on the clarifying response.

In some embodiments, determining the predicted content topic of the query is based in part on the generated one or more user parameters.

In some embodiments, determining the predicted content topic comprises generating a confidence score corresponding to a level of confidence that the predicted content topic is associated with the query.

In some embodiments, the method comprises directing the user to a live agent if the confidence score is below a predetermined threshold.

In some embodiments, the method comprises providing the content suggestion to the user.

In some embodiments, providing the content suggestion to the user comprises providing a link to a content repository comprising data corresponding to the content suggestion.

In some embodiments, providing the content suggestion to the user comprises providing information corresponding to the content suggestion from a content repository directly to the user.

In some embodiments, receiving the query comprises receiving information from the user via one of a voice input, a chat message in a chatbot, and an email.

A system for generating a personalized content suggestion in response to a query from a user may comprise one or more processors configured to cause the system to receive the query from the user, generate one or more user parameters associated with the user, determine a predicted content topic of the query, and generate the content suggestion based on the predicted content topic and the one or more user parameters.

A non-transitory computer-readable storage medium may store instructions for generating a personalized content suggestion in response to a query from a user. The instructions may be configured to be executed by a system comprising one or more processors to cause the system to receive the query from the user, generate one or more user parameters associated with the user, determine a predicted content topic of the query, and generate the content suggestion based on the predicted content topic and the one or more user parameters.

Additional advantages will be readily apparent to those skilled in the art from the following detailed description. The aspects and descriptions herein are to be regarded as illustrative in nature and not restrictive. It will be appreciated that any of the variations, aspects, features, and options described in view of the systems apply equally to the methods and vice versa. It will also be clear that any one or more of the above variations, aspects, features, and options can be combined.

All publications, including patent documents, scientific articles, and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

BRIEF DESCRIPTION OF THE FIGURES

Various embodiments are described with reference to the accompanying figures, in which:

FIG. 6C shows a representation of an exemplary virtual assistant chatbot interface providing a content link in response to a user query, according to one or more examples of the disclosure;

FIG. 6D shows a representation of an exemplary virtual assistant chatbot interface providing guidance to a user within the chatbot in response to a user query, according to one or more examples of the disclosure;

DETAILED DESCRIPTION

Figure 1:
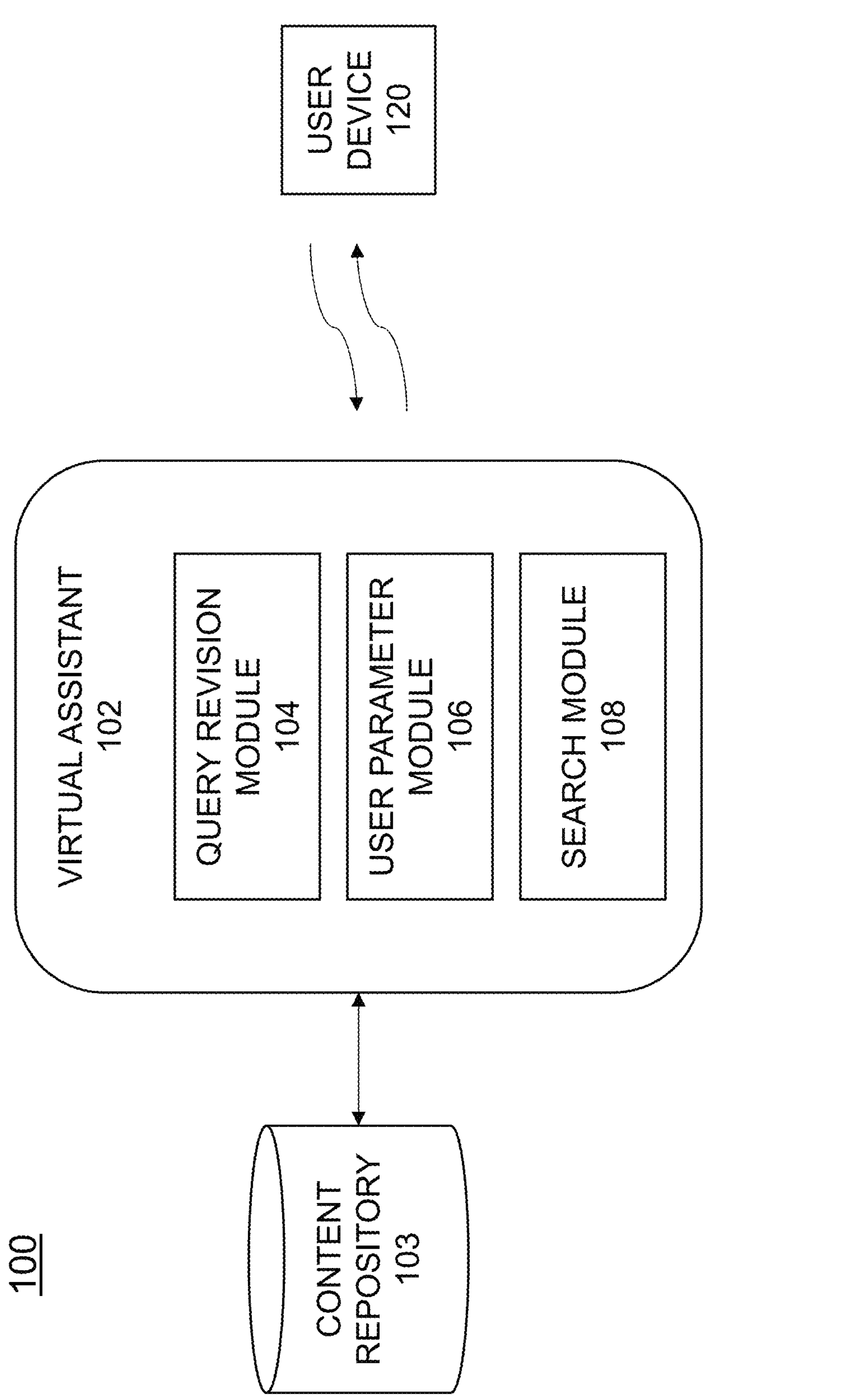
FIG. 1 shows a functional block diagram of an exemplary system for generating personalized content suggestions in response to a user query, according to one or more examples of the disclosure.

Described herein are methods and systems for generating a personalized content suggestion in response to a query from a user. The user can provide a search query to a chatbot-style interface of a virtual assistant, and the virtual assistant can refine the user's search query to identify content from a content repository to suggest to the user. The virtual assistant may refine the user's search query based on one or more user parameters and/or one or more narrowing questions to determine which content from the content repository to suggest to the user. In this manner, the virtual assistant can generate a personalized content suggestion that is tailored based on parameters associated with the user and/or the user's responses to the narrowing questions.

The virtual assistant can generate one or more user parameters that are associated with the user. The user parameters can include, for example, biographical information pertaining to the user (such as the user's occupation and/or hierarchy, employer, industry, professional organization involvement, etc.), and/or engagement-specific query information associated with the user (such as the user's past search queries and/or past search queries of other users associated with the user, etc.). The virtual assistant can generate the one or more user parameters in a variety of manners. For instance, the virtual assistant may passively generate one or more user parameters based on metadata associated with the user. The virtual assistant may actively generate the one or more user parameters based on the user's responses to one or more questions provided directly to the user, such as within a chatbot-style interface.

The virtual assistant can analyze and revise the user's search query. For example, the virtual assistant may extract one or more entities from the query and perform entity matching to classify those extracted entities as matched or unmatched based on data from a knowledge substrate. The virtual assistant may perform entity resolution and/or entity expansion to identify synonyms, correct typographical errors, identify related topic areas, etc. The virtual assistant may request additional information from the user by suggesting one or more topic areas, and/or providing one or more scoping queries to the user to narrow the scope of the user's search. The virtual assistant can then revise the search query based on the user's responses to the suggestions and/or scoping queries.

The virtual assistant can search for content within a content repository using the revised search query and the generated one or more user parameters. To search for content within the content repository, the virtual assistant can compare the revised query to data in the content repository to classify the query as matched or unmatched. The virtual assistant may determine a confidence score for any matched query, which may be based in part on the one or more user parameters. The virtual assistant may request additional information from the user by providing one or more clarifying questions to the user to substantively narrow the user's search within a particular topic area. The virtual assistant can identify a predicted content topic based on the search of the content repository. The virtual assistant can provide this predicted content topic to the user in the form of a content suggestion. The virtual assistant may provide technical guidance from the predicted content topic area directly to the user.

In the following description of the various examples, reference is made to the accompanying drawings, in which are shown, by way of illustration, specific examples that can be practiced. The description is presented to enable one of ordinary skill in the art to make and use the invention and is provided in the context of a patent application and its requirements. Various modifications to the described examples will be readily apparent to those persons skilled in the art and the generic principles herein may be applied to other examples. Thus, the present invention is not intended to be limited to the examples shown but is to be accorded the widest scope consistent with the principles and features described herein.

FIG. 1 shows a functional block diagram of an exemplary system 100 for generating personalized content suggestions in response to a user query, according to one or more examples. The system 100 can include a virtual assistant platform 102 that receives user queries from a user device 120 (or a plurality of user devices) and supplies personalized content suggestions of content in a content repository 103 in response to the user's query.

The content repository 103 may store information curated by subject matter experts, such as a financial professional, that can be useful for analyzing certain issues. For instance, the content repository 103 can store technical guidance that may be useful to a user when analyzing how to perform aspects of an audit or classify entities in a business combination. The content repository 103 may contain historical data from past interactions between the virtual assistant platform 102 and users. The content repository 103 may store one or more knowledge graphs for analyzing and refining queries, as will be discussed below.

Interaction between the virtual assistant platform 102 and the content repository 103 may be query based. For example, interaction with the content repository 103 may be question answering, information retrieval, query into a knowledge graph engine and/or inferencing engine (e.g., against inferencing rules). The virtual assistant platform 102 can be communicatively connected to a plurality of content repositories 103, which may implement security measures and require privilege to access the information of the content repository 103. The data that the virtual assistant platform 102 receives from the content repository 103 may be provided in any suitable data format.

The virtual assistant platform 102 can provide an intelligent virtual assistant to the user, which can be in the form of a chatbot-style interface, that provides content from the content repository 103 to the user device 120. The virtual assistant platform 102 can engage in a "conversation" with a user via a virtual assistant by providing responses based on inputs received via the user device 120. For instance, a user may provide a query seeking technical guidance in a particular subject matter area to the virtual assistant, and the virtual assistant can provide responses to the user that seek to narrow the query, such as scoping queries that define the scope of the user's search and/or clarifying queries that refine the substantive content of the user's search. By narrowing the query in this manner, the virtual assistant may determine what specific content the user is seeking from the content repository 103 and then provide a content suggestion to the user device 120. The content suggestion may include technical guidance information. For example, a content suggestion may provide information regarding how to determine the accounting acquirer in a business combination with a new entity.

The virtual assistant platform 102 can provide content suggestions to the user device 120 in any suitable format. For example, the virtual assistant platform 102 may provide a selectable link to the location of the content within the content repository 103. The virtual assistant platform 102 may provide technical guidance to the user directly within a virtual assistant interface (e.g., within the "chat" window between the user and the virtual assistant) and may provide a selectable export option that enables the user to export the conversation and/or the content the virtual assistant provided to the user.

The virtual assistant platform 102 can receive user queries from the user device 120 in any suitable format. For example, the virtual assistant platform 102 may receive user queries from a user supplying inputs to a virtual assistant (e.g., to a chatbot interface) via the user device 120. The virtual assistant platform 102 may receive another written submission, such as an email message, from the user device 120. The virtual assistant platform 102 may receive a voice message from the user device 120. When the virtual assistant platform 102 receives a user query that is not within a virtual assistant interface, the virtual assistant platform 102 may automatically commence a virtual assistant session by opening a virtual assistant interface with the user device 120.

The virtual assistant platform 102 may be a cloud-based platform that is communicatively connected to the user device 120 via a wired or wireless network (e.g., the Internet, an intranet, a local areas network (LAN), a metropolitan area network (MAN), a wide area network (WAN), etc.). The virtual assistant platform 102 may be hosted on a server (or a combination of servers) that also hosts the user device 120. To access a virtual assistant interface, the user may download a software application from the virtual assistant platform 102. Alternatively, the user may access the virtual assistant interface using a client, such as a web browser (e.g., CHROME, EDGE, SAFARI, etc.) or any client application capable of interfacing with the virtual assistant platform 102.

The virtual assistant platform 102 can be provided by one or more processors which may be hosted locally and/or remotely from one another, from content repository 103, and/or from user device 120. Virtual assistant platform 102 may be provided by one or more cloud-hosted processors. Virtual assistant platform 102 may include several modules for providing the intelligent virtual assistant. For example, the virtual assistant platform 102 can include a query revision module 104, a user parameter module 106, and a search module 108. Each of the query revision module 104, the user parameter module 106, and the search module 108 may be provided by one or more processors (including one or more of the same processors as one another) configured to perform any one or more of the techniques disclosed herein. The modules may be provided separately from one another or may be combined in a wholly or partially combined manner with one another. The modules may be communicatively coupled with one another and/or with the virtual assistant platform 102. The modules may include software programs that the virtual assistant platform 102 can execute in response to receiving a query from a user via a user device 120. The virtual assistant platform 102 may act as an orchestration engine and be configured to coordinate cooperative functionalities between the query revision module 104, the user parameter module 106, and/or the search module 108. For example, the virtual assistant platform 102 may coordinate exchange of data between said modules and/or control the way an output generated by one of said modules may trigger and/or implement a functionality of another module. In one or more examples, any of the query revision module 104, the user parameter module 106, and the search module 108 may receive user inputs for certain specifications as described herein.

Figure 2:
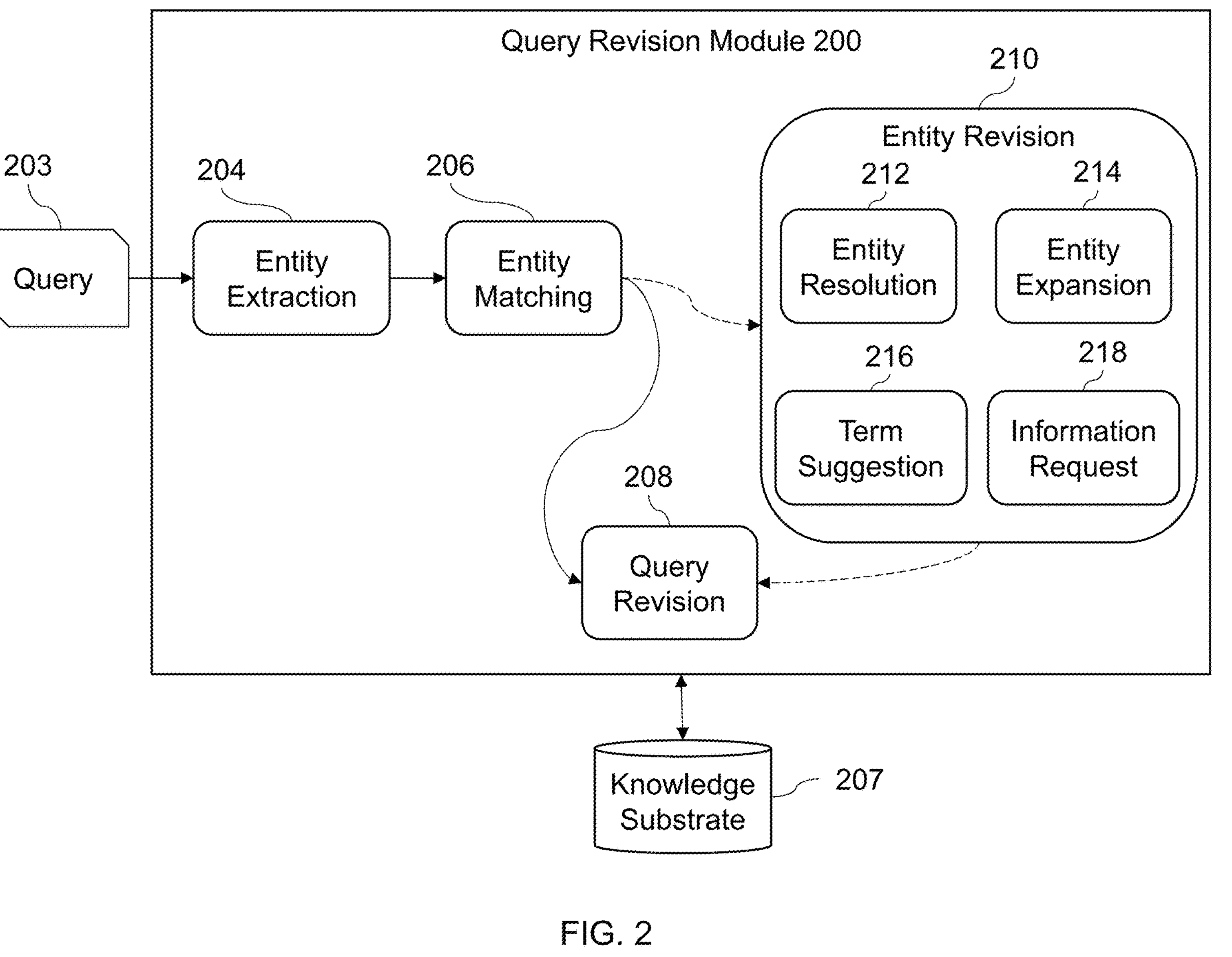
FIG. 2 shows a functional block diagram of an exemplary query revision module, according to one or more examples of the disclosure.

FIG. 2 shows a functional block diagram of an exemplary query revision module 200, according to one or more examples of the disclosure. The query revision module 200 may be implemented as a software module of a data processing platform, such as the virtual assistant platform 102 of FIG. 1, and may share any one or more characteristics in common with query revision module 104. The query revision module 200 may include an entity extraction engine 204, an entity matching engine 206, a query revision engine 208, and an entity revision engine 210 having an entity resolution engine 212, an entity expansion engine 214, a term suggestion engine 216, and/or an information request engine 218. Each of said engines may be implemented by one or more servers, individually and/or separately from one another. Optionally, data processing performed by these engines may be performed by a single engine.

In one or more examples, the query revision module 200 may be communicatively connected to a knowledge substrate 207 or may include a knowledge substrate 207. The knowledge substrate 207 can store information that is useful for identifying appropriate search terms for searching a content repository. An appropriate search term can include a term that is associated with information in the content repository such that when the search term is used to search the content repository, the associated information can be returned. In one or more examples, the information contained in the knowledge substrate 207 may be dynamically updated as information stored in one or more content repositories is updated, such as information stored in the content repository from which a user is requesting information. As the information stored in the content repository is updated, the information stored in the knowledge substrate 207 may be updated so that the information in the knowledge substrate 207 can be used to identify an appropriate search term to search for information in the content repository.

The knowledge substrate 207 can include any one or more data sources such as an external data source, a curated query data source, and/or a historical query data source. External data may include data that is provided from an external data repository, such as the World Wide Web. External data may include external knowledge relating to a particular entity, such as a specific audit client, a particular industry or geographic area, etc. Curated query data may include, for example, predefined decision trees created by subject matter experts that provide guidance based on common search queries. Historical query data can include data associated with past sessions of users seeking guidance from a virtual assistant.

Components of the query revision module 200 may receive data from the knowledge substrate 207 on a scheduled basis, in response to a user input (such as in response to receiving a query 203 from a user), in response to one or more trigger conditions being met, and/or in response to the data being manually sent. Data received from the knowledge substrate 207 may be provided in any suitable data format. Interaction with the knowledge substrate 207 may be query based. For example, interaction with the knowledge substrate 207 may be question answering, information retrieval, and/or query into a knowledge graph engine and/or inferencing engine (e.g., against inferencing rules).

The query revision module 200 can receive a query 203 that is then processed via the entity extraction engine 204. The query 203 may be generated by a user and provided to a virtual assistant platform that provides a chatbot-style interface, such as the virtual assistant platform 102 of FIG. 2. The query 203 may include a text string, textual information, and/or other language information, and may be provided in a structured and/or unstructured format. Upon receiving a query 203, the entity extraction engine 204 may perform data processing operations in order to extract entities from the query 203 and/or normalize extracted entities to generate output data.

The one or more data processing operations may include character recognition operations, information extraction operations, and/or natural learning language understanding models. The entity extraction engine 204 may apply one or more deep learning-based text detection and recognition operations. Said operations may include a flexible optical character recognition (OCR) operation, which may generate data representing characters recognized in the query 203. In one or more examples, the one or more data operations applied by the entity extraction engine 204 may be defined by a user, defined by system settings, defined by a third-party input, and/or dynamically determined by the query revision module 200.

The entity extraction engine 204 may process the query 203 to perform one or more normalization data processing operations. A normalization data processing operation may normalize the entities extracted from the query 203 for subsequent comparison or classification. Examples include (but are not limited to), removal of certain characters (such as commas or question marks), standardization to all lowercase text, normalization of known name data (such as based on a known alias, abbreviations, etc.), and/or removal of any extraneous characters or words that are not part of the extracted entities (such as removing “what is” at the beginning of a search query).

The entity extraction engine 204 may generate output data that identifies one or more entities extracted from the query 203. An entity can include a search term, which may correspond to a known search term or may be a new search term that is distinct from the known search terms. For example, a query 203 may state “what is contingent consideration in business combination,” and the extracted entities can include: “contingent consideration” and “business combination.” In one or more examples, the entity extraction engine 204 may rely on information stored in the knowledge substrate 207 to extract entities from the query 203. For instance, the entity extraction engine 204 may extract certain words and group them into an entity because the knowledge substrate contains a known search term that combines those words together. If a query states, "business combination," the entity extraction engine may thus extract "business" and "combination" as two separate entities, and/or extract "business combination" as a single entity if there is a known search term corresponding to "business combination" in the knowledge substrate 207. In some embodiments, entities may be extracted without reference to known search terms, for example based completely on syntactical analysis of a text string that is input as a part of query 203.

Output data generated by the entity extraction engine 204 may be transmitted to the entity matching engine 206. The entity matching engine 206 can compare the entities extracted by the entity extraction engine 204 to data corresponding to known entities. For example, the entity extraction engine 206 can query the knowledge substrate 207 for matching terms (for example using a string comparison, a fuzzy matching algorithm, a comparison of respective embeddings, and/or any other suitable comparison technique). To perform entity matching, the entity matching engine 206 may rely on one or more machine-learning models.

When comparing the entities for entity matching, the entity matching engine 206 may generate output data that classifies the extracted entities as "matched" (those that correspond to one or more search terms in a knowledge substrate 207) or "unmatched." To classify a particular entity as a matched entity, the entity matching engine 206 may rely on a confidence score and a minimum threshold. For instance, the entity matching engine 206 may determine that the extracted entity "contingent consideration" is a 60% match to the known search term "contingency" from the knowledge substrate 207. The minimum threshold to designate a particular extracted entity as a matched entity may be, for example 75%, 85%, 95%, or greater. In one or more examples, the minimum threshold may be less than 75%.

For any extracted entities that are classified as unmatched, the query revision module 200 may perform further processing. For instance, unmatched entities may be processed via the entity revision engine 210. In one or more examples, only the unmatched extracted entities, or a portion of the unmatched extracted entities, will be processed further. In one or more examples, if any of the extracted entities from a query 203 are classified as unmatched, all of the extracted entities from that query 203 will be processed further by the entity revision engine 210. Optionally, even if all of the extracted entities are classified as matched, the matched extracted entities may nonetheless be processed further by the entity revision engine 210.

The entity revision engine 210 can revise one or more of the extracted entities from a query 203 to generate appropriate search terms for searching a content repository and/or to perform a targeted search of a content repository. The entity revision engine 210 can include a number of sub-engines, such as an entity resolution engine 212, an entity expansion engine 214, a term suggestion engine 216, and/or an information request engine 218.

The entity resolution engine 212 can analyze the extracted entities (matched and/or unmatched) to perform certain data processing functions to standardize the extracted entities. For example, the entity resolution engine 212 may query the knowledge substrate 207 for search terms that are synonyms of part or all of the extracted entities. In addition or alternatively, the entity resolution engine 212 may identify and/or correct typographical errors in the extracted entities. The entity resolution engine 212 may identify typographical errors in response to the entity resolution engine 212 identifying an unknown word.

The entity expansion engine 214 may analyze the extracted entities (matched and/or unmatched) and expand one or more of the extracted entities. The entity expansion engine 214 may analyze a given extracted entity to identify the topic area of that entity and then expand that extracted entity based on one or more search terms associated with that topic area. For instance, the extracted entity "business combination" may be expanded to include additional search terms such as "merger," "asset acquisition," and "goodwill." Expanding extracted entities can be based on information within the knowledge substrate 207.

The term suggestion engine 216 can analyze the extracted entities (matched and/or unmatched) and identify one or more search terms and/or search topics that the extracted entities relate to. For example, the term suggestion engine 216 may identify the related search term of "asset acquisition" based on the search term "business combination." The term suggestion engine 216 can suggest this additional search term to the user that submitted the query 203 and provide the user with an affordance that enables the user to specify the additional search term ("asset acquisition") should be included in the search of the content repository, or should replace the original search term ("business combination"). Identifying related search terms and/or search topics can be based on information within the knowledge substrate 207.

The information request engine 218 may analyze the extracted entities (matched and/or unmatched) and determine that additional information is necessary to refine the extracted entities. For instance, if one or more of the extracted entities are not a match to a known search term from the knowledge substrate 207, the information request engine 218 may determine that additional information should be requested from the user who submitted the query 203. Said determination may be based on one or more levels of matching determined by entity matching engine 206; for example, if entity matching engine 206 determined with a low- or moderate-confidence match, or if entity matching engine determines multiple possible matches of the same or approximately the same confidence to different entities, then information request engine 218 may determine that additional information from the user should be solicited.

To request additional information, the query revision module 200 may utilize a virtual assistant to provide one or more questions to the user. For example, the query revision module 200 may provide one or more scoping questions to the user. Scoping questions can include questions that narrow the scope of a search such as by identifying a particular content repository or subset of a content repository, to search, similar to search filters when searching a database. For instance, scoping questions may narrow a search to a particular topic area, a subset of documents, a date range of documents, a particular author, etc. Upon receiving responses to one or more scoping questions, the information request engine 218 can analyze the extracted entities to refine the extracted entities based on the new information. For instance, if an extracted entity is "combination," the information request engine 218 can query the user "do you mean business combination?" If the user confirms, the information request engine 218 can thus refine the extracted entity to be "business combination." If the user denies, the information request engine 218 may provide a new query to the user to refine the unknown extracted entity. The information that the information request engine 218 provides to the user can be based on information within the knowledge substrate 207.

Output data generated by the entity extraction engine 204, the entity matching engine 206, and/or the entity revision engine 210 (and any sub-engines thereof) can be transmitted to the query revision engine 208. The query revision engine 208 can rewrite the query 203 based on the output data received from any of these engines. If a particular query 203 states "business combination" the rewritten query may be the same, that is, the rewritten may be "business combination" if that entity is a strong match to a known search term in the knowledge substrate 207 and the entity was not revised by the entity revision engine 210. Alternatively, the query may instead be rewritten based on data processing performed by the entity revision engine 210. For example, the same query "business combination" may be rewritten by the query revision engine 208 as "business combination," "merger," "asset acquisition," "goodwill," or any combination thereof if the entity expansion engine 214 identifies those search terms as related to the extracted entities, if those search terms were confirmed by the user in response to suggestions provided by the term suggestion engine 216, and/or in based on information from the information request engine 218.

Figure 3:
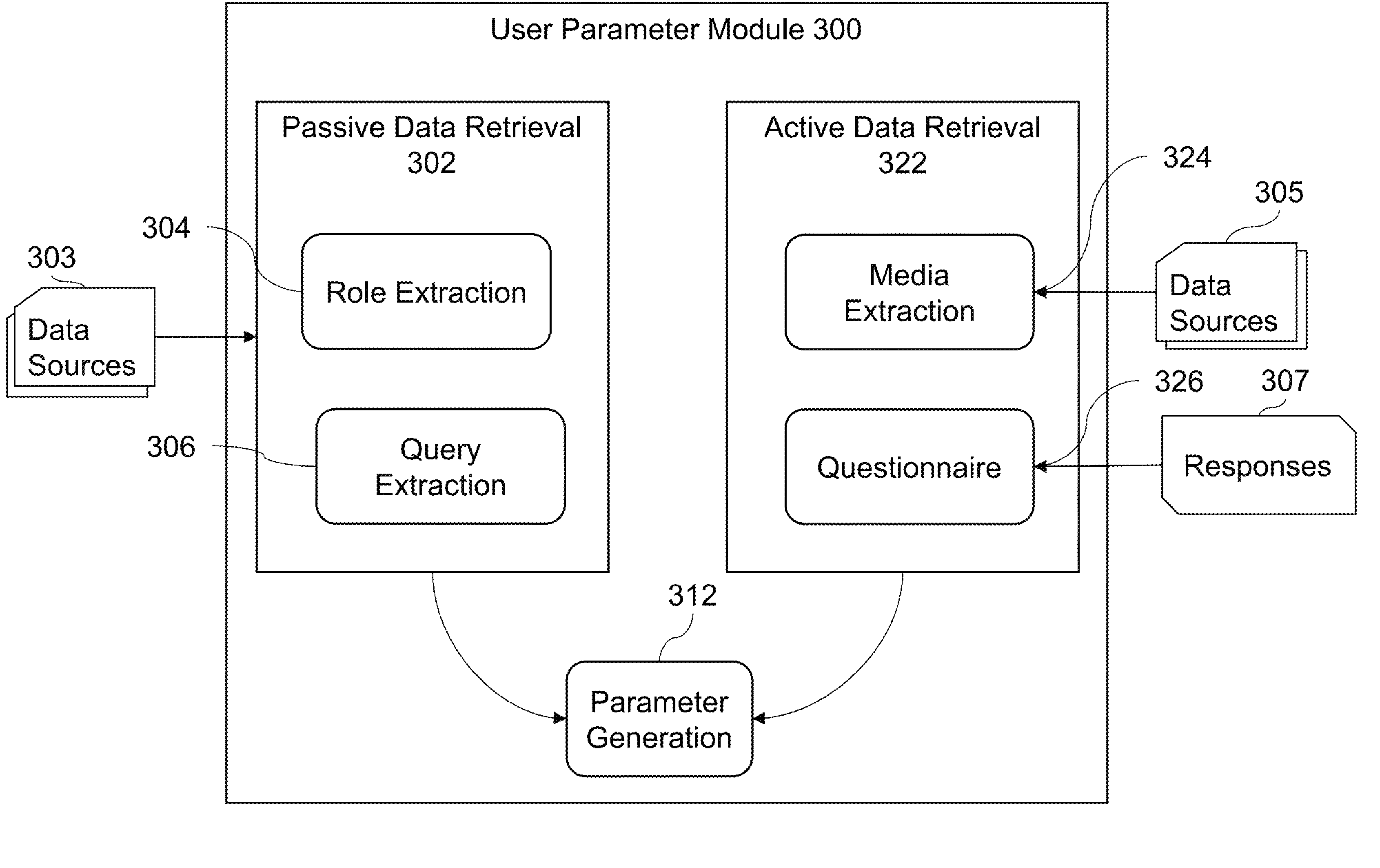
FIG. 3 shows a functional block diagram of an exemplary user parameter module, according to one or more examples of the disclosure.

FIG. 3 shows a functional block diagram of an exemplary user parameter module 300, according to one or more examples of the disclosure. User parameter module 300 may share any one or more characteristics in common with user parameter module 106. The user parameter module 300 may be implemented as a software module of a data processing platform, such as the virtual assistant platform 102 of FIG. 1. The user parameter module 300 may perform passive and/or active data retrieval to generate one or more parameters associated with a user that submits a query to a virtual assistant. The one or more parameters generated by the user parameter module 300 can be used to personalize the content suggestions provided by a virtual assistant platform in response to a query submitted by a user. To retrieve data related to a user, the user parameter module 300 can include a passive data retrieval engine 302 and an active data retrieval engine 322.

The passive data retrieval engine 302 can be communicatively connected to one or more data sources 303 that contain information associated with one or more users. The data sources 303 can store various types of metadata associated with a number of users, which may be platform-specific (e.g., related to the users' engagement and/or credentials with certain platforms such as Aura), biographical (e.g., a user's occupation and/or hierarchy, employer, industry, professional organization involvement, etc.), and/or engagement-specific (specific projects the user is assigned to or has been assigned to, clients the user has performed work for, other users or team members the user works or has worked with, etc.).

The passive data retrieval engine 302 can access the one or more data sources 303 on a scheduled basis, in response to a user input (such as in response to a virtual assistant receiving a query from a user), in response to one or more trigger conditions being met, and/or in response to the data being manually sent. In one or more examples, the passive data retrieval engine 302 can access the one or more data sources 303 before a virtual assistant receives a query from a user. For example, the passive data retrieval engine 302 may generate and maintain a user profile database about a number of users that have utilized the virtual assistant in the past and/or have access to utilize the virtual assistant.

The passive data retrieval engine 302 can include a number of sub-engines that extract specific parameters from the data sources 303. For example, the passive data retrieval engine 302 can include a role extraction engine 304, and/or a query extraction engine 306. The role extraction engine 304 can extract platform-specific and/or biographical information pertaining to a user, such as the user's occupation and/or hierarchy, employer, industry, professional organization involvement, etc. The query extraction engine 306 can extract engagement-specific query information associated with past queries submitted by the user or other users. For example, when generating parameters about a particular user, the query extraction engine 306 can retrieve the particular user's past queries submitted to the virtual assistant and/or past queries submitted by other users that are associated with the particular user (such as by virtue of working together on certain projects, working on the same clients, within the same industry, etc.)

In one or more examples, one or more functionalities performed by the active data retrieval engine 322 may be performed in response to the passive data retrieval engine 302 determining that additional information is necessary to generate one or more parameters about the user. The active data retrieval engine 322 can be communicatively connected to one or more data sources 305. The data sources 305 can be external data sources such as social media accounts (e.g., LinkedIn, Quora, Reddit), that can provide context regarding the user's engagements, project experiences, recent and/or past queries, etc. In one or more examples, before accessing user information about a particular user from the data sources 305, the active data retrieval engine 322 can prompt the particular user to opt-in and enable access to the user's information stored by those data sources 305.

The active data retrieval engine 322 can utilize a questionnaire engine 326 that provides one or more queries to the user in order to obtain more information about the user. The questionnaire engine 326 can interact with the user via a chatbot-style virtual assistant and provide one or more questions to the user to solicit responses 307. For instance, the questionnaire engine 326 can prompt the user to input certain information, such as biographical information, engagement-specific information, etc. In one or more examples, the questionnaire engine 326 can solicit responses 307 from the user using one or more fill-in-the-blank style affordances that the user can interact with to provide information.

Output data generated by the passive data retrieval engine 302 and/or the active data retrieval engine 322 can be transmitted to the parameter generation engine 312. The parameter generation engine 312 can generate one or more user parameters about the user. Exemplary user parameters that the parameter generation engine 312 may generate include, for example, biographical information pertaining to the user (such as the user's occupation and/or hierarchy, employer, industry, professional organization involvement, etc.), engagement-specific query information associated with the user (such as past queries submitted to the virtual assistant by the user and/or by other users associated with the user, etc.). User parameters generated by the parameter generation engine 312 can be used to provide personalized search results in response to a user's query to a virtual assistant, as will be described below.

Figure 4:
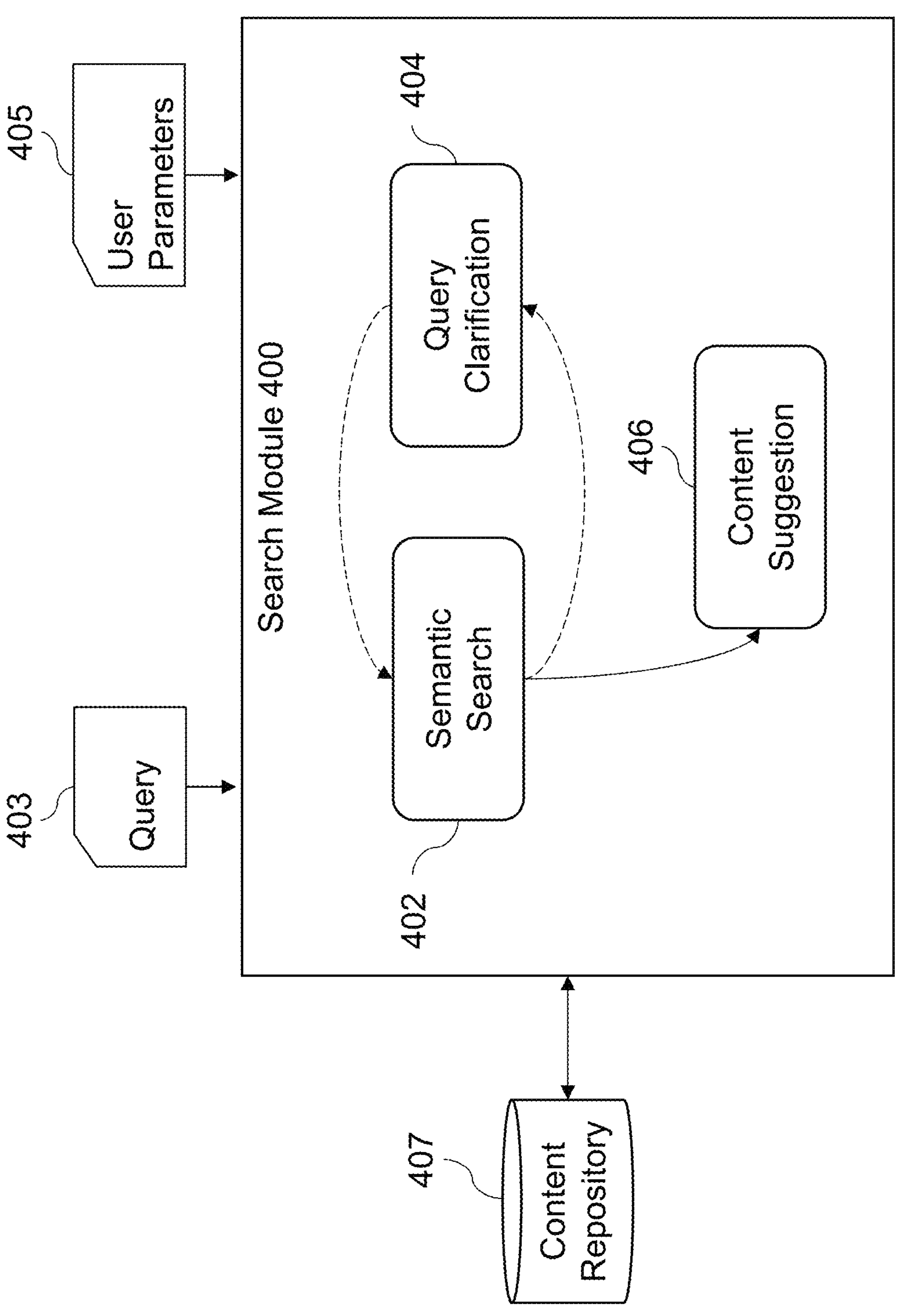
FIG. 4 shows a functional block diagram of an exemplary search module, according to one or more examples of the disclosure.

FIG. 4 shows a functional block diagram of an exemplary search module 400, according to one or more examples of the disclosure. Search module 400 may share any one or more characteristics in common with search module 108. The search module 400 may be implemented as a software module of a data processing platform, such as the virtual assistant platform 102 of FIG. 1. The search module 400 can retrieve content from a content repository 407 and provide one or more content suggestions to a user via a chatbot-style interface. The content suggestions provided by the search module 400 can include a link to specific content within the content repository 407, and/or information or technical guidance from the content repository 407.

The search module 400 can receive a query 403 and one or more user parameters 405. The query 403 can be provided from a query revision module, such as the query revision module 200 of FIG. 2, and may be a revised version of a query provided by a user to a virtual assistant, such as a virtual assistant provided by the virtual assistant platform 102 of FIG. 1. In one or more examples, the query 403 may not have been rewritten by a query revision module, and may be the query provided directly from a user. The one or more user parameters 405 can be provided from a user parameter module, such as the user parameter module 300, which may be parameters that are associated with the specific user that provided the query 403 to a virtual assistant.

The search module 400 can include a semantic search engine 402, a query clarification engine 404, and a content suggestion engine 408. The semantic search engine 402 can search the content repository 407 for content that is related to the query 403. Upon receiving a query 403, the semantic search engine 402 can compare the query 403 to data in the content repository 407 and classify the query 403 as "matched" or "unmatched." A matched query can include a query for which there exists associated information in the content repository 407. To classify a particular query as a matched query, the semantic search engine 402 may rely on a confidence score and a minimum threshold. For instance, the semantic search engine 402 may determine that the query "accounting acquirer AND/OR business combination" is a 90% match to content stored in the content repository 407 related to the topic of "determining the accounting acquirer in a business combination." The minimum threshold to designate a particular query as a matched query may be, for example, 75%, 85%, 95%, or greater. In one or more examples, the minimum threshold may be less than 75%.

The semantic search engine 402 may compare the query 403 to data in the content repository 407 using text encoding techniques. The query 403, along with the information in the content repository 407, may be encoded as an N-dimensional vectors (where N>0 is a positive integer). The similarity between a vector $\overrightarrow{V_Q}$ encoding the query 403 and a vector $\overrightarrow{V_{CR}}$ representing information in the content repository 407 may be quantified by computing the cosine similarity score between $\overrightarrow{V_Q}$ and $\underline{V_{CR}}$. The cosine similarity score may be the cosine of the angle θ between $\overrightarrow{V_Q}$ and $\overrightarrow{V_{CR}}$, which may be computed, for example, using Equation 1:

$$\cos\theta = \frac{\overrightarrow{V_Q} \cdot \overrightarrow{V_{CR}}}{|\overrightarrow{V_Q}||\overrightarrow{V_{CR}}|}. \quad \text{(Eq. 1)}$$

In Equation 1, $\overrightarrow{V_Q} \cdot \overrightarrow{V_{CR}}$ is the inner product of $\overrightarrow{V_Q}$ and $\overrightarrow{V_{CR}}$, and $|\overrightarrow{V_Q}||\overrightarrow{V_{CR}}|$ is the product of the magnitude of $\overrightarrow{V_Q}$ and the magnitude of $\overrightarrow{V_{CR}}$.

The query 403 may be compared to data in the content repository 407 by computing cosine similarity scores between the vector encoding query 403 and vector(s) encoding data in the content repository 407. An indexing method (e.g., from the Faiss library) can be used to increase computation speed. Once the cosine similarity scores between the vector encoding query 403 and the vector(s) encoding the data in the content repository 407 have been computed, the semantic search engine 402 may classify the query 403 as "matched" or "unmatched" by determining whether any one or more of the cosine similarity scores surpasses a minimum threshold cosine similarity score. If a cosine similarity score between the query 403 and a piece of stored data in the content repository 407 exceeds the minimum threshold cosine similarity score, then the semantic search engine 402 may determine that the query 403 is a match to that piece of stored data. On the other hand, if a cosine similarity score between the query 403 and a piece of stored data in the content repository 407 does not exceed the minimum threshold cosine similarity score for any stored content in the content repository, then the semantic search engine 402 may determine that the query 403 is not a match to that piece of stored data.

The minimum threshold cosine similarity score may be empirically or experimentally determined and/or may be provided by a user. In some embodiments, the minimum threshold cosine similarity score can be greater than or equal to 0.1, 0.2, 0.3, 0.4, or 0.5. In other embodiments, the minimum threshold cosine similarity score can be less than or equal to 1, 0.9, 0.8, 0.7, or 0.6. In some embodiments, the minimum threshold cosine similarity score is about 0.99.

In one or more examples, the semantic search engine 402 can utilize the one or more user parameters 405 to classify the query 403 as matched or unmatched, and/or to determine the confidence score of a matched query. For instance, the semantic search engine 402 may determine that a particular user is likely interested in a particular topic area of content in the content repository 407 based on user parameters that indicate team members that the particular user works with have searched similar queries and/or accessed content in that particular topic area. When relying on the user parameters to classify a query as a match to particular content, the user parameters may be used to boost a confidence score that the query is a match with particular content. In one or more examples, the user parameters may be used to pre-emptively identify one or more topic areas that the user is likely to be interested in, and the semantic search engine 402 can search within those topic areas to identify content associated with the query.

For any queries the semantic search engine 402 classifies as unmatched, the semantic search engine 402 can trigger the query clarification engine 404 to further refine the query. The output of the query clarification engine 404 can include a refined query that is classified as "matched." In one or more examples, the query clarification engine 404 may request additional information from a user to refine a query. To request additional information, the query clarification engine 404 may utilize a virtual assistant to provide one or more questions to the user. For example, the query clarification engine 404 may provide one or more clarifying questions to the user. Clarifying questions can include questions that substantively narrow a search within a particular topic area in a content repository, similar to supplying additional search terms to an existing search when searching a database. For instance, clarifying questions may narrow a search to a particular subset of technical guidance related to a particular topic. Upon receiving responses to one or more clarifying questions, the query clarification engine 404 can refine the query based on the new information.

The query clarification engine 404 may step through a decision tree of technical guidance, presenting queries to the user to walk through the decision tree and narrow the query based on the user's responses to the queries. For instance, if a query is "determine accounting acquirer in a business combination with new legal entity," the query clarification engine 404 can query the user "has it already been concluded that one of the two entities should be identified as the acquirer?" If the user confirms this is the case (responds "yes"), the query clarification engine 404 may determine that a particular subset of information is relevant to the query. In contrast, if the user responds that this is not the case (responds "no"), the query clarification engine 404 may determine that a different particular subset of information is relevant to the query. This determination, selecting between different particular subsets of information, is akin to selecting one of two paths of a decision tree.

In one or more examples, the query clarification engine 404 may step through part of a decision tree of technical guidance without presenting queries to the user. For example, the query clarification engine 404 can preemptively step through a decision tree based on the user parameters 405 to substantively narrow the query without requiring input from the user and/or without presenting clarifying questions to the user. In one or more examples, the query clarification engine 404 may step through part of a decision tree of technical guidance and present queries to the user to further refine the query.

For any queries the semantic search engine 402 classifies as matched (i.e., matched queries) and/or queries that have been clarified by the query clarification engine 404, the content suggestion engine 406 can identify content within the content repository 407 to suggest to a user. The content suggestion engine 406 can suggest content to a user via a chatbot-style interface of a virtual assistant, such as via a virtual assistant provided by the virtual assistant platform 102 of FIG. 1.

The content suggestion engine 406 may suggest content to a user by providing a link to the location where the content is stored in the content repository 407. The content suggestion engine 406 may suggest content to a user by providing the content directly to the user, such as within a chatbot-style interface and/or via another messaging format (e.g., email, instant message, etc.) In one or more examples, the content suggestion engine 406 can provide an affordance to the user that enables the user to export a transcript of the session with the virtual assistant. For instance, if the query clarification engine 404 engaged in a conversational discourse with the user to refine the query and walked through a decision tree, that information may be useful to the user and can be exported to the user. When exporting information, such as a session transcript, the information may be provided to the user in any suitable format, such as by email, direct download, link, etc.

In one or more examples, the suggestion provided by the content suggestion engine 406 can be based on the confidence score determined by the semantic search engine 402. For example, if the confidence score is above the minimum threshold to be classified as a match (e.g., a match threshold) but below a minimum threshold to be classified as a strong match (e.g., a strong match threshold), the suggestion provided by the content suggestion engine 406 may include a prompt that signals to the user that they should consult with a live agent. The suggestion provided by the content suggestion engine 406 may automatically redirect the user to a live agent. In one or more examples, the content suggestion engine 406 may automatically redirect the user to a live agent based on the particular content that is identified as a match to the query. For instance, a particular content topic may be complex and/or flagged as requiring a consultation with a live agent, and thus in response to identifying that particular content as a match to a query, the content suggestion engine 406 can automatically redirect the user to a live agent.

Figure 5:
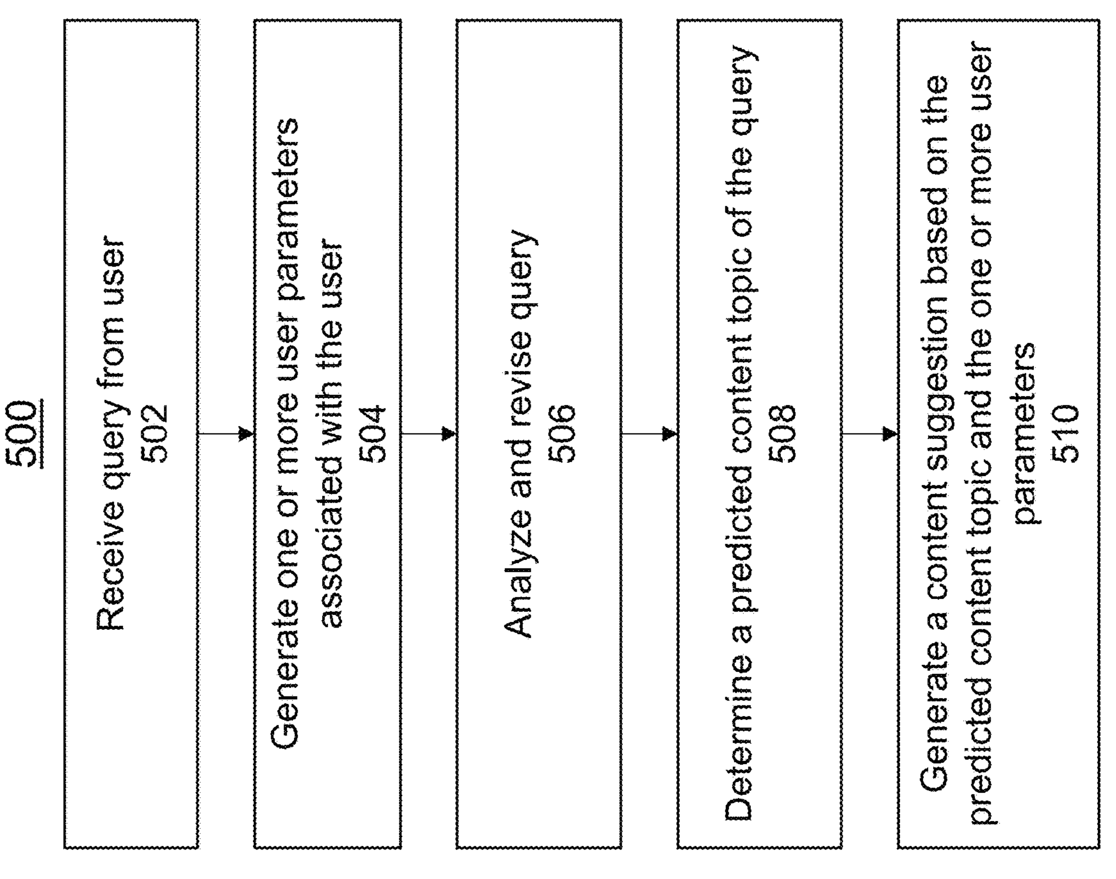
FIG. 5 shows an exemplary method for generating a content suggestion in response to a user query, according to one or more examples of the disclosure.

FIG. 5 shows an exemplary method 500 for generating a content suggestion in response to a user query, according to one or more examples of the disclosure. The method 500 may be performed by a virtual assistant platform that provides a chatbot-style virtual assistant to a user, such as the virtual assistant platform 102 of FIG. 1. One or more of the data processing operations performed via method 500 may be defined by a user, defined by system settings, defined by a third-party input, and/or dynamically determined by the system executing the method 500. In one or more examples, a system executing the method 500 may perform one or more automated system actions that are triggered based on the output data generated from method 500. For instance, as discussed above, the system may automatically redirect the user to a live agent in response to a trigger condition being met based on the content being suggested to the user and/or a confidence score associated with match score between the content being suggested and the query being below a predetermined threshold.

In one or more examples, the method 500 can begin with block 502, wherein a query is received from a user. The query can be received from a user supplying one or more inputs to a virtual assistant (e.g., to a chatbot-style interface) using a user device. The query may be received via any suitable means, such as via a virtual assistant, an email message, and/or a voice message. The query can represent a request for particular content from a content repository. For instance, the user can provide the query to a virtual assistant with the intent that the virtual assistant suggest particular content (e.g., technical guidance) from a content repository. Accordingly, the query can be similar to a search term provided to a search engine, however, the method 500 can include additional steps to capture personal information about the user and/or refine the query to identify content for the user and provide that content to the user in the form of a personalized suggestion.

At block 504, one or more user parameters associated with the user are generated. One or more of the data processing functionalities performed at block 504 can be performed by a user parameter module, such as the user parameter module 300 of FIG. 3. One or more of the functionalities described above with respect to the user parameter module 300 of FIG. 3 may be performed at block 504 to generate the one or more user parameters. The one or more user parameters generated at block 504 can include, for example, biographical information pertaining to the user (such as the user's occupation and/or hierarchy, employer, industry, professional organization involvement, etc.), and/or engagement-specific query information associated with the user (such as past queries submitted to the virtual assistant by the user and/or by other users associated with the user, etc.) The one or more user parameters generated at block 504 can be used to personalize the content suggested via method 500 to a user in response to receiving the query from the user at block 502.

In one or more examples, the one or more user parameters may be generated before receiving the query from the user at block 502. For instance, as noted above, the system executing the method 500 may generate and maintain user profiles about a number of users that have utilized the virtual assistant in the past and/or have access to utilize the virtual assistant. One or more of the user parameters may be generated before receiving the query at block 504 and then updated in response to receiving the query from the user at block 502. For instance, some user parameters may be generated in a passive manner relying on metadata associated with the user, and after receiving a query from the user at block 502, one or more user parameters may be updated and/or generated in an active manner relying on the user's responses to one or more questions in a questionnaire provided to the user. The one or more user parameters may be generated in response to receiving the query from the user at block 502.

At block 506, the query can be analyzed and revised. One or more of the data processing functionalities performed at block 506 may be performed by a query revision module, such as the query revision module 200 of FIG. 2. One or more of the functionalities described above with respect to the query revision module 200 of FIG. 2 may be performed at block 506 to analyze and revise the query. For instance, at block 506, the system executing the method 500 can extract one or more entities from the query received at block 502 and perform entity matching to classify those entities as matched or unmatched based on data from a knowledge substrate. The system may revise the entity by performing entity resolution and/or entity expansion to identify synonyms, correct typographical errors, identify related topic areas, etc. The system may request further information from the user, such as by suggesting certain terms or topic areas and/or providing one or more scoping questions to the user to narrow the scope of the user's search.

In one or more examples, the analysis performed at block 506 can involve performing an initial analysis to determine whether the exact same query has been asked to the virtual assistant before in a previous session. If so, the same path of guidance that was provided in that previous session can be provided to the user. In one or more examples, the method 500 may only provide the same path to guidance as a previous session if the user from the previous session provided positive feedback to the virtual assistant at the conclusion of that previous session. Optionally, the data functionalities described with respect to the query revision module 200 are only performed if the query is not initially recognized as an exact match to a previous query and/or highly similar to a previous query.

At block 508, a predicted content topic of the query is determined. One or more of the data processing functionalities performed at block 508 may be performed by a search module, such as the search module 400 of FIG. 4. One or more of the functionalities described above with respect to the search module 400 may be performed at block 508 to determine the predicted content topic of the query. For instance, at block 508, the system executing the method 500 can compare the query to data in the content repository to classify the query as matched or unmatched. The query that is compared to the content repository can be a query that was revised at block 506.

At block 508, the system may determine a confidence score for any matched query. To classify the query as matched or unmatched and/or to determine the confidence score, the system may rely on user parameters generated at block 504. For example, the user parameters may be used to identify a particular topic area that the user is likely interested in and/or to boost a confidence score that the query is matched to a particular topic area. In one or more examples, when determining the predicted content topic at block 508 the system executing the method 500 may request additional information from the user, such as by providing one or more clarifying questions to the user to substantively narrow the user's search within a particular topic area.

At block 510, a content suggestion is generated based on the predicted content topic determined at block 508 and the user parameters generated at block 504. The content suggestion that is generated can be the content from the content repository that was matched to the query at block 508.

In one or more examples, after generating the content suggestion at block 510, the content suggestion can be provided to the user. Providing the content suggestion to the user can involve providing content to the user within a chatbot-style interface of a virtual assistant. For instance, technical guidance can be provided directly to the user within the chatbot interface. Providing the content suggestion to the user can involve providing the user a link to the location where the content is stored in the content repository. Providing the content suggestion to the user may involve providing an affordance to the user that enables the user to export a transcript of the session with the virtual assistant, which may be exported in any suitable format.

In one or more examples, the content suggestion to the user can include a prompt that signals to the user that they should consult with a live agent, and/or that automatically redirects the user to a live agent. This may occur if, for example, the content being suggested may automatically trigger this redirection/prompting because it is complex and/or has been flagging as requiring a live consultation by a subject matter expert, or the confidence score of the match between the content and the query is below a predetermined threshold.

Figure 6A:
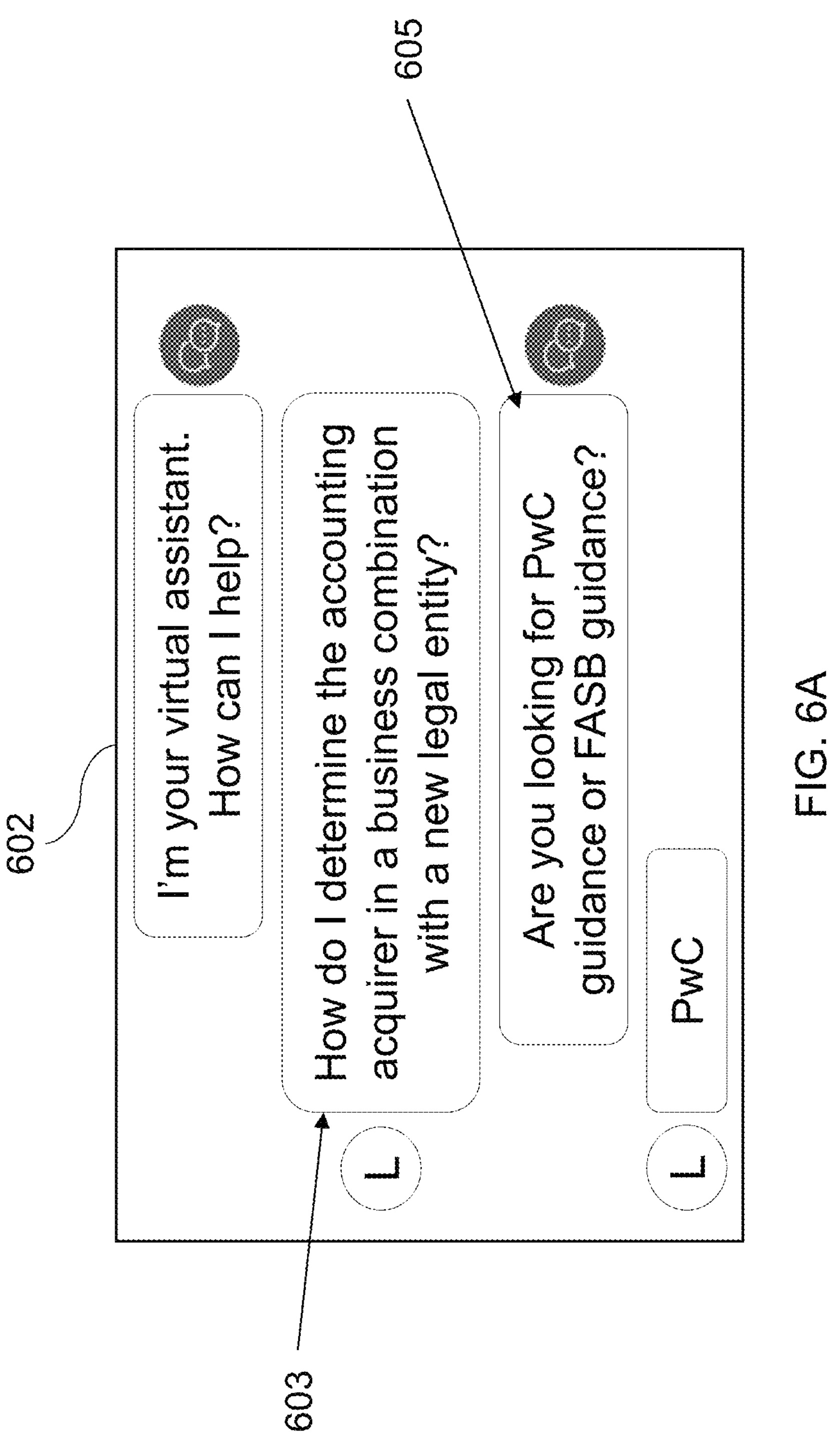
FIG. 6A shows a representation of an exemplary virtual assistant chatbot interface providing scoping queries to a user, according to one or more examples of the disclosure.
Figure 6B:
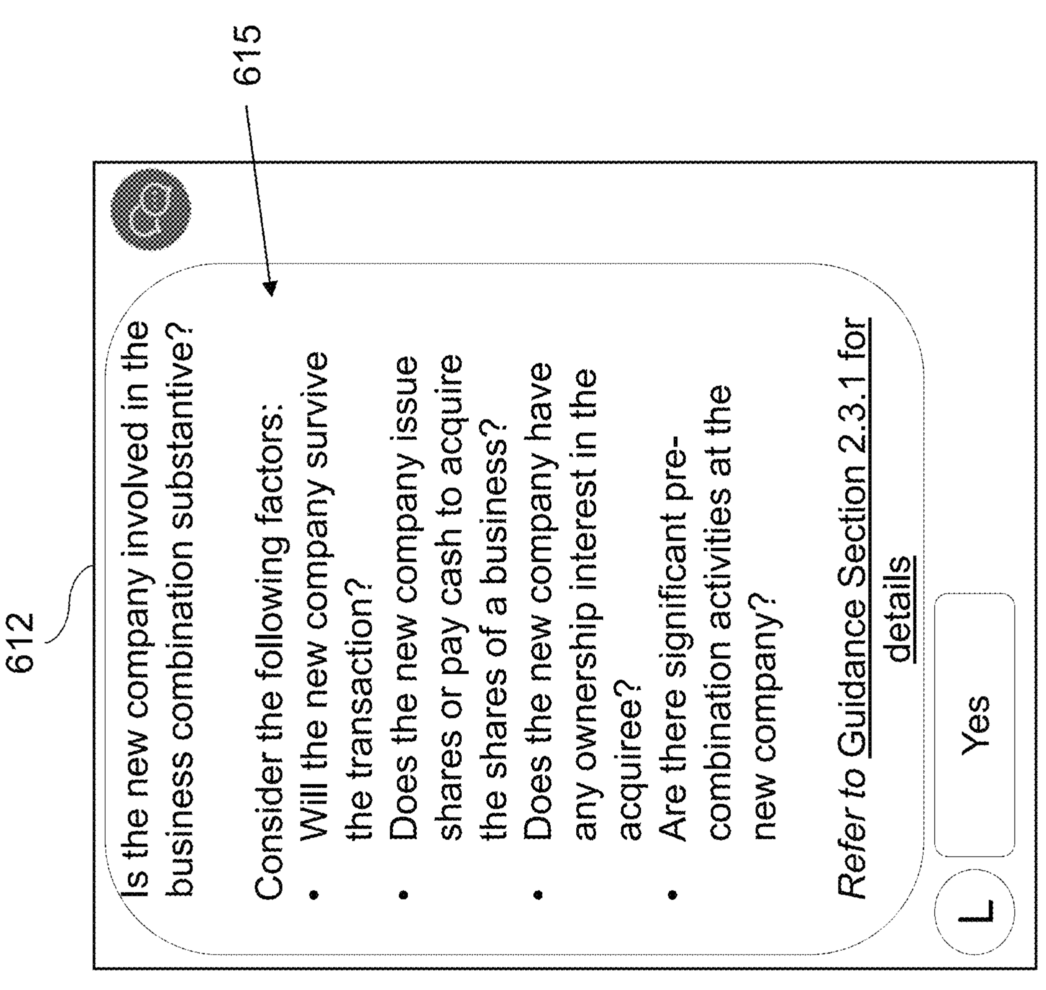
FIG. 6B shows a representation of an exemplary virtual assistant chatbot interface providing clarifying queries to a user, according to one or more examples of the disclosure.

As discussed above, a virtual assistant platform can refine a user's search query using questions provided to a user via a chatbot-styler interface. Examples of this are shown in FIG. 6A and FIG. 6B. FIG. 6A shows a representation of an exemplary virtual assistant chatbot interface 602, according to one or more examples of the disclosure. Within the chatbot interface 602, the user submitted a query 603 and the virtual assistant provided a scoping query 605 to refine the query 603. As discussed above, a scoping query can be used to define the scope of a search for content in a content repository. As shown in FIG. 6A, the scoping query 605 seeks to narrow the scope of the user's query 603 by identifying a particular type of guidance, PwC guidance or FASB (financial accounting standards board). The user's response to this scoping query 605 can be used to narrow the search performed by the virtual assistant and thus provide the user with more relevant search results.

FIG. 6B shows a representation of an exemplary virtual assistant chatbot interface 612, according to one or more examples of the disclosure. Within the chatbot interface 612, the virtual assistant provided a clarifying query 615 to further refine the user's query. As discussed above, a clarifying query can be used to substantively narrow a search within a particular content area. The clarifying query 615 provided within the chatbot interface 612 attempts to further narrow the user's search within a particular topic area. The user's response to this clarifying query 615 can be used to narrow the search performed by the virtual assistant and enable the virtual assistant to identify specific content within the content repository that is most applicable to the user's query.

As discussed above, the content suggestion provided to the user can be provided to the user via a chatbot-style interface. Exemplary content suggestions are provided in FIGS. 6C and 6D. FIG. 6C shows a representation of an exemplary virtual assistant chatbot interface 622 providing a content link 625, whereas FIG. 6D shows a representation of an exemplary virtual assistant chatbot interface 632 providing guidance to directly a user via a response 635 within the chatbot, as well as an affordance 637 to export the guidance.

Figure 7A:
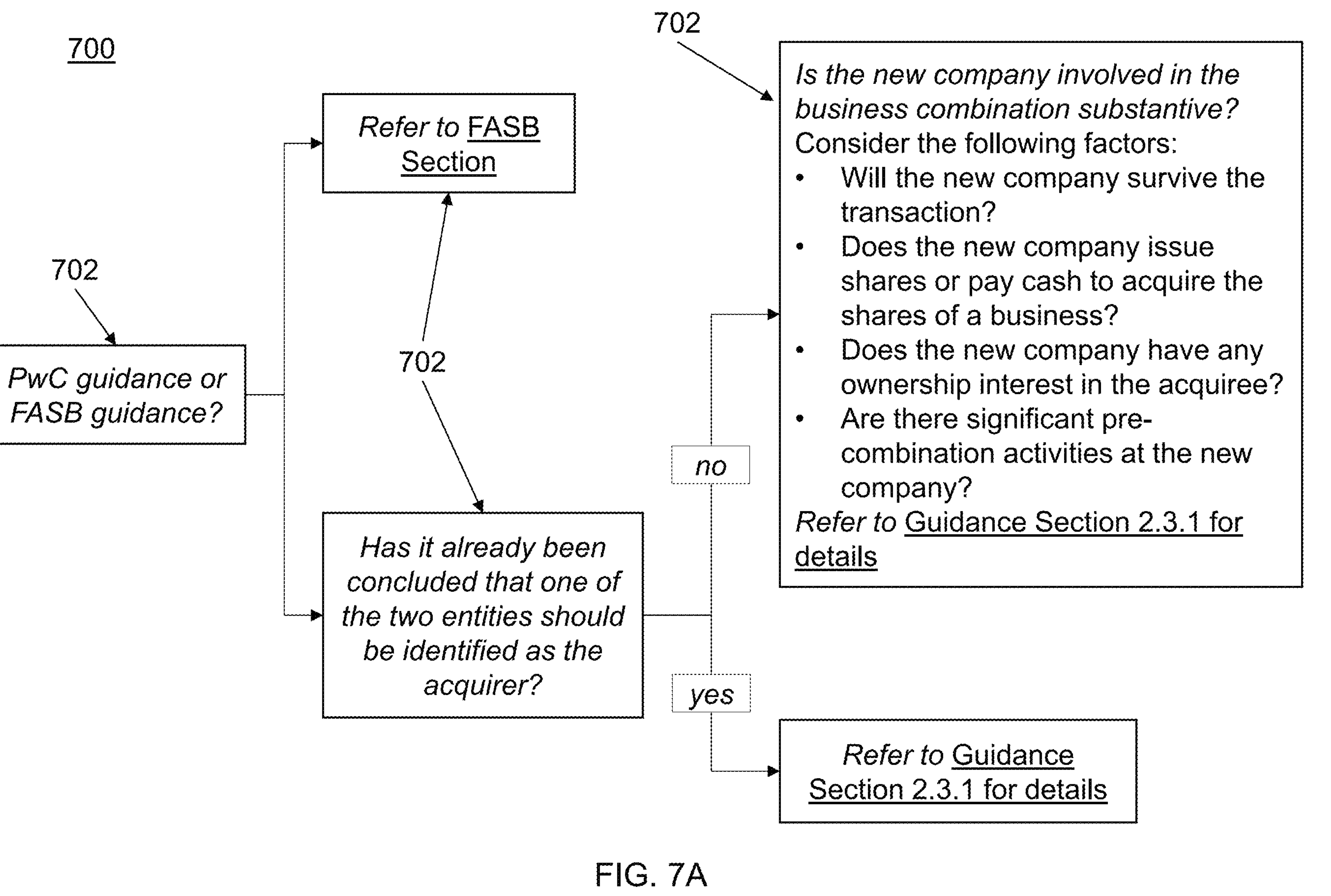
FIG. 7A shows an exemplary decision tree for responding to a user query, according to one or more examples of the disclosure.
Figure 7B:
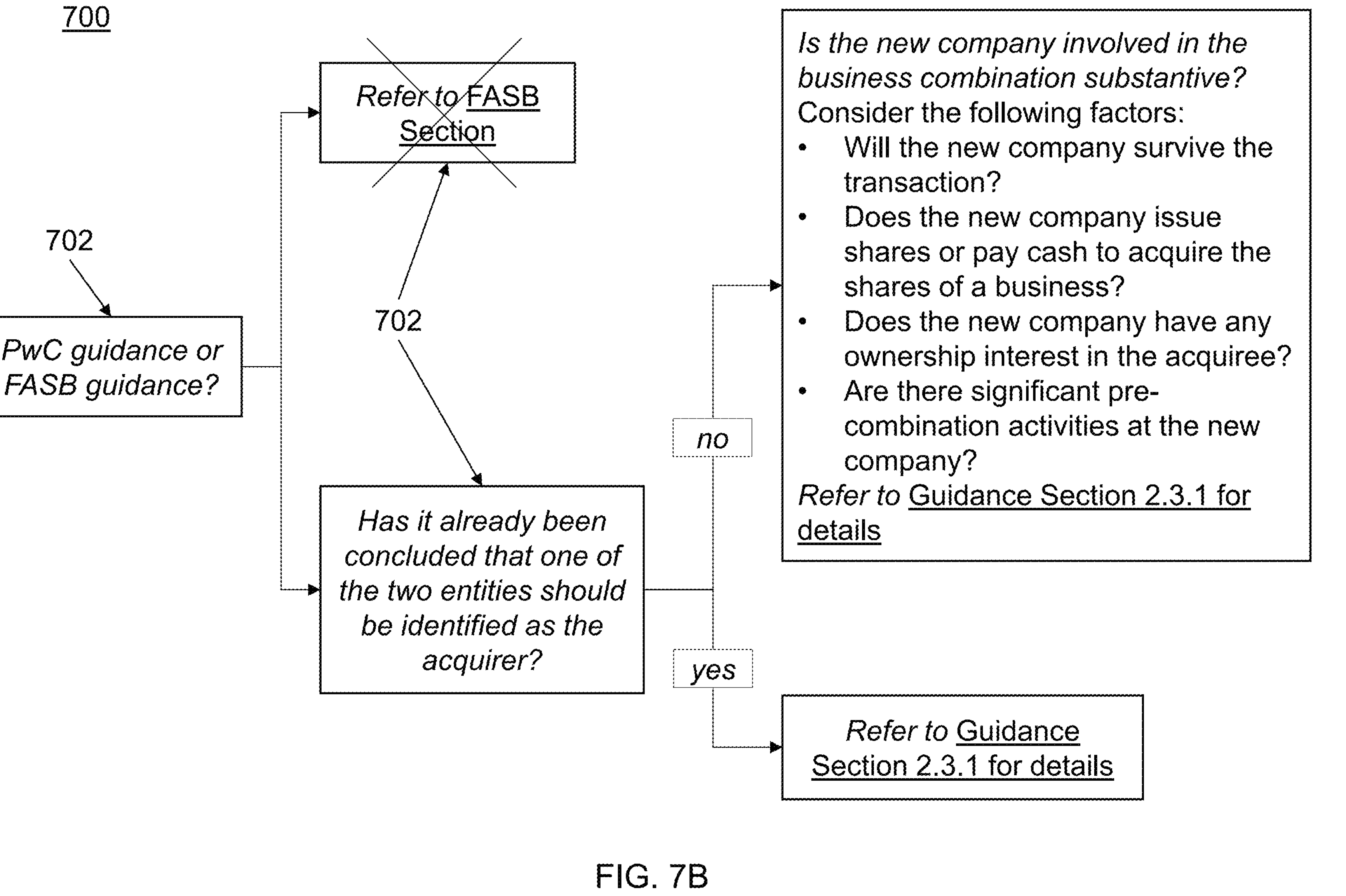
FIG. 7B shows a pre-answered version of the decision tree of FIG. 7A after applying user parameters associated with the user, according to one or more examples of the disclosure.

As discussed above with respect to the search module 400 of FIG. 4, searching for content in a content repository that is related to a user's query can involve stepping through a decision tree of technical guidance. This can involve stepping through a decision tree based on queries providing to the user and/or based on user parameters generated based on the user. An exemplary decision tree is shown in FIG. 7A, which depicts an exemplary decision tree 700 for responding to a user query, according to one or more examples of the disclosure. The decision tree 700 can be curated by a subject matter expert and can be one of a number of decision trees stored in the content repository that the user is searching for content from. When stepping through this decision tree 700 based on queries provided to the user, scoping and/or clarifying questions based on the decision tree can be presented to the user via the chatbot interface. For instance, the scoping query 605 of FIG. 6A and the clarifying query 615 of FIG. 6B each correspond to a node 702 of the decision tree 700. When stepping through the decision tree 700 based on user parameters generated based on the user, those user parameters may be used to step through part or all of the decision tree 700 without presenting any queries to the user. For example, the same decision tree 700 is shown in FIG. 7B, however some of the nodes 702 of the decision tree 700 have been pre-emptively crossed out. In this example, the user parameters generated based on the user may indicate that a team member of the user has recently utilized the virtual assistant to retrieve content from the content repository using a similar search query, and that team member was seeking PwC guidance rather than FASB guidance.

Figure 8:
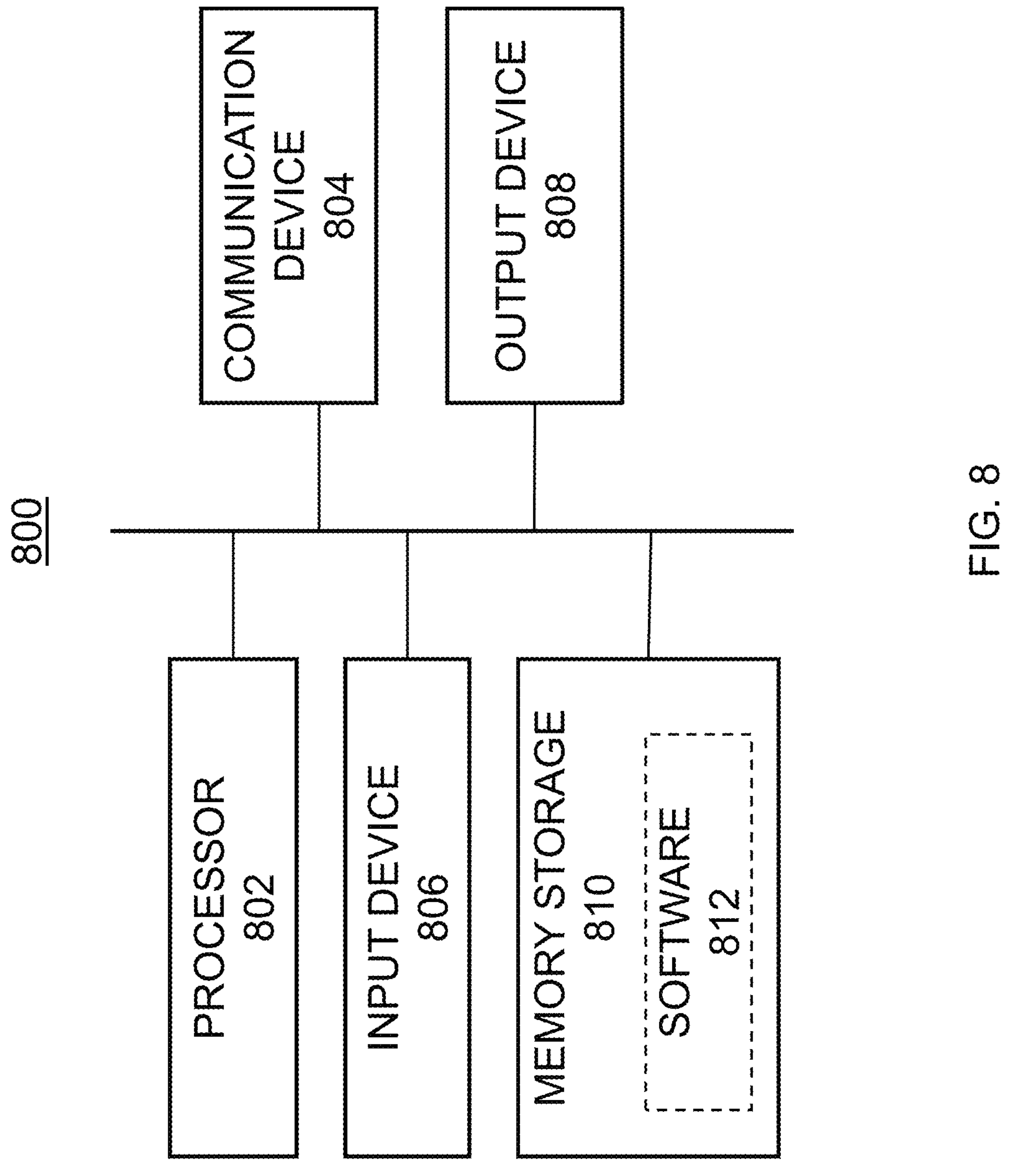
FIG. 8 shows an exemplary computing device, according to one or more examples of the disclosure.

FIG. 8 shows an exemplary computing device 800, according to one or more examples of the disclosure. Device 800 can be a component of a virtual assistant platform, such as the virtual assistant platform 102 of FIG. 1. In one or more examples, device 800 can be configured to execute a method for generating a content suggestion in response to a user query, such as method 500 of FIG. 5. Device 800 can be a host computer connected to a network. Device 800 can be a client computer or a server. As shown in FIG. 8 device 800 can be any suitable type of microprocessor-based device, such as a personal computer, workstation, server, or handheld computing device (portable electronic device) such as a phone or tablet. The device can include, for example, one or more of processors 802, input device 806, output device 808, storage 810, and communication device 804. Input device 806 and output device 808 can generally correspond to those described above and can either be connectable or integrated with the computer.

Input device 806 can be any suitable device that provides input, such as a touch screen, keyboard or keypad, mouse, or voice-recognition device. Output device 808 can be any suitable device that provides output, such as a touch screen, haptics device, or speaker.

Storage 810 can be any suitable device that provides storage, such as an electrical, magnetic, or optical memory, including a RAM, cache, hard drive, or removable storage disk. Communication device 804 can include any suitable device capable of transmitting and receiving signals over a network, such as a network interface chip or device. The components of the computer can be connected in any suitable manner, such as via a physical bus or wirelessly.

Software 812, which can be stored in storage 810 and executed by processor 802, can include, for example, the programming that embodies the functionality of the present disclosure (e.g., as embodied in the devices as described above).

Software 812 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 810, that can contain or store programming for use by or in connection with an instruction execution system, apparatus, or device.

Software 812 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 800 can implement any operating system suitable for operating on the network. Software 812 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

Although particular examples relating to search processes that provide content suggestions relating to financial information have been described above, the methods, devices, and systems described herein are applicable to other applications as well. For instance, the data processing operations described with respect to method 500 of FIG. 5 may be implemented to provide content suggestions in a variety of topics such as academia, law, general searching, etc. Accordingly, the methods, devices, and systems described herein are not inherently related to any particular application.

The preceding description sets forth exemplary methods, parameters and the like. It should be recognized, however, that such description is not intended as a limitation on the scope of the present disclosure but is instead provided as a description of exemplary embodiments. The illustrative embodiments described above are not meant to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques, and various embodiments with various modifications as are suited to the particular use contemplated.

Although the preceding description uses terms first, second, etc., to describe various elements, these elements should not be limited by the terms. These terms are only used to distinguish one element from another. Also, it is also to be understood that the singular forms "a," "an," and "the" used in the preceding description are intended to include the plural forms as well unless the context indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

In some embodiments, a non-transitory computer-readable storage medium stores one or more programs configured to be executed by one or more processors of an electronic device, the one or more programs including instructions for implementing any of the steps described or claimed herein. The present disclosure also relates to a device for performing the operations herein. This device may be specially constructed for the required purposes, or it may include a general-purpose computer selectively activated or reconfigured by a computer program stored in the computer. Such a computer program may be stored in a non-transitory, computer computer-readable storage medium, such as, but not limited to, any type of disk, including floppy disks, optical disks, CD-ROMs, magnetic-optical disks, read-only memories (ROMs), random access memories (RAMs), electrically program read-only memories (EPROMs), electronically erasable program read-only memories EEPROMs, magnetic or optical cards, application specific integrated circuits (ASICs), or any type of media suitable for storing electronic instructions, and each coupled to a computer system bus. Furthermore, the computers referenced in this disclosure may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems appears from the description above. Also, the present disclosure is not described with reference to any particular programming language. It will be appreciated that a variety of programming languages may be used to implement the teachings of the present disclosure as described herein.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A method for generating a personalized content suggestion in response to a query from a user, wherein the method is performed by a system comprising one or more processors, the method comprising:

receiving the query from the user;

generating one or more user parameters associated with the user, wherein the one or more user parameters comprise identifying information associated with the user;

determining a similarity between the query and data in a content repository, comprising obtaining a vector representation of the query, identifying one or more topic areas within the content repository based on the one or more user parameters, and comparing the vector representation of the query to a vector encoding the data in the data repository within the one or more topic areas;

classifying the query as unmatched in accordance with the similarity being below a minimum threshold;

in accordance with classifying the query as unmatched, revising the query to generate a revised query, wherein revising the query comprises:

automatically traversing a first portion of a decision tree based at least in part on the one or more user parameters, wherein the one or more user parameters pre-answer one or more nodes of the first portion of the decision tree to narrow the query without presenting questions from the decision tree to the user; and traversing a second portion of the decision tree to further narrow the query, comprising presenting one or more questions from the second portion of the decision tree to the user, receiving input from the user responsive to the one or more questions, and narrowing the query based on the received input from the user responsive to questions from the decision tree;

determining a predicted content topic of the revised query; and generating the content suggestion based on the predicted content topic and the one or more user parameters.

2. The method of claim 1, wherein revising the query comprises:

providing a scoping prompt to the user;

receiving a scoping response from the user in response to providing the scoping prompt to the user; and revising the query based on the scoping response.

3. The method of claim 1, wherein revising the query comprises:

providing one or more topic suggestions to the user;

receiving a selected content topic of one or more potential content topics in response to providing the one or more topic suggestions to the user; and revising the query based on the selected content topic.

4. The method of claim 3, wherein the one or more topic suggestions are generated based on information from a knowledge substrate.

5. The method of claim 1, wherein generating the one or more user parameters comprises:

providing one or more user context prompts to the user;

receiving one or more user context responses from the user in response to providing the one or more user context prompts to the user; and generating the one or more user parameters based on the one or more user context responses.

6. The method of claim 1, wherein generating the one or more user parameters comprises analyzing metadata associated with the user.

7. The method of claim 6, wherein the metadata associated with the user comprises one or more of the user's search history, metadata associated with one or more team members on a team with the user, past projects completed by the user, and a job title of the user.

8. The method of claim 1, wherein determining the predicted content topic comprises:

providing a clarifying prompt to the user;

receiving a clarifying response from the user in response to providing the clarifying prompt to the user; and determining the predicted content topic based on the clarifying response.

9. The method of claim 1, wherein determining the predicted content topic of the revised query is based in part on the generated one or more user parameters.

10. The method of claim 1, wherein determining the predicted content topic comprises generating a confidence score corresponding to a level of confidence that the predicted content topic is associated with the revised query.

11. The method of claim 10, comprising directing the user to a live agent if the confidence score is below a predetermined threshold.

12. The method of claim 1, comprising providing the content suggestion to the user.

13. The method of claim 12, wherein providing the content suggestion to the user comprises providing a link to a content repository comprising data corresponding to the content suggestion.

14. The method of claim 12, wherein providing the content suggestion to the user comprises providing information corresponding to the content suggestion from a content repository directly to the user.

15. The method of claim 1, wherein receiving the query comprises receiving information from the user via one of a voice input, a chat message in a chatbot, and an email.

16. A system for generating a personalized content suggestion in response to a query from a user, the system comprising one or more processors configured to cause the system to:

receive the query from the user;

generate one or more user parameters associated with the user, wherein the one or more user parameters comprise identifying information associated with the user;

determine a similarity between the query and data in a content repository, comprising obtaining a vector representation of the query, identifying one or more topic areas within the content repository based on the one or more user parameters, and comparing the vector representation of the query to a vector encoding the data in the data repository within the one or more topic areas;

classify the query as unmatched in accordance with the similarity being below a minimum threshold;

in accordance with classifying the query as unmatched, revise the query to generate a revised query, wherein revising the query comprises:

automatically traversing a first portion of a decision tree based at least in part on the one or more user parameters, wherein the one or more user parameters pre-answer one or more nodes of the first portion of the decision tree to narrow the query without presenting questions from the decision tree to the user; and traversing a second portion of the decision tree to further narrow the query, comprising presenting one or more questions from the second portion of the decision tree to the user, receiving input from the user responsive to the one or more questions, and narrowing the query based on the received input from the user responsive to questions from the decision tree;

determine a predicted content topic of the revised query; and generate the content suggestion based on the predicted content topic and the one or more user parameters.

17. A non-transitory computer-readable storage medium storing instructions for generating a personalized content suggestion in response to a query from a user, the instructions configured to be executed by a system comprising one or more processors to cause the system to:

receive the query from the user;

generate one or more user parameters associated with the user, wherein the one or more user parameters comprise identifying information associated with the user;

determine a similarity between the query and data in a content repository, comprising obtaining a vector representation of the query, identifying one or more topic areas within the content repository based on the one or more user parameters, and comparing the vector representation of the query to a vector encoding the data in the data repository within the one or more topic areas;

classify the query as unmatched in accordance with the similarity being below a minimum threshold;

in accordance with classifying the query as unmatched, revise the query to generate a revised query, wherein revising the query comprises:

automatically traversing a first portion of a decision tree based at least in part on the one or more user parameters, wherein the one or more user parameters pre-answer one or more nodes of the first portion of the decision tree to narrow the query without presenting questions from the decision tree to the user; and traversing a second portion of the decision tree to further narrow the query, comprising presenting one or more questions from the second portion of the decision tree to the user, receiving input from the user responsive to the one or more questions, and narrowing the query based on the received input from the user responsive to questions from the decision tree;

determine a predicted content topic of the revised query; and generate the content suggestion based on the predicted content topic and the one or more user parameters.

* * * * *